(12) United States Patent
Benkelman

(10) Patent No.: US 6,694,064 B1
(45) Date of Patent: Feb. 17, 2004

(54) DIGITAL AERIAL IMAGE MOSAIC METHOD AND APPARATUS

(75) Inventor: Cody Benkelman, Whitefish, MT (US)

(73) Assignee: Positive Systems, Inc., Whitefish, MT (US)

( * ) Notice: Subject to any disclaimer, the term of this patent is extended or adjusted under 35 U.S.C. 154(b) by 521 days.

(21) Appl. No.: 09/718,440

(22) Filed: Nov. 20, 2000

Related U.S. Application Data

(60) Provisional application No. 60/166,551, filed on Nov. 19, 1999.

(51) Int. Cl.[7] .................................................. G06K 9/36
(52) U.S. Cl. ...................... 382/284; 382/294; 348/144
(58) Field of Search ............................ 382/48, 54, 56, 382/100, 133, 154, 232, 233, 263, 268, 284, 294; 709/217; 345/420, 582, 679, 719; 430/313, 315; 348/144

(56) References Cited

U.S. PATENT DOCUMENTS

| | | | |
|---|---|---|---|
| 5,027,422 A | 6/1991 | Peregrim et al. | 382/48 |
| 5,168,530 A | 12/1992 | Peregrim et al. | 382/48 |
| 5,173,949 A | 12/1992 | Peregrim et al. | 382/48 |
| 5,187,754 A * | 2/1993 | Currin et al. | 382/284 |
| 5,325,449 A | 6/1994 | Burt et al. | 382/56 |
| 5,343,410 A | 8/1994 | Tsujiuchi et al. | 364/525 |
| 5,528,290 A | 6/1996 | Saund | 348/218 |
| 5,581,637 A | 12/1996 | Cass et al. | 382/284 |
| 5,649,032 A | 7/1997 | Burt et al. | 382/284 |
| 5,710,835 A * | 1/1998 | Bradley | 382/233 |
| 5,768,439 A | 6/1998 | Suzuka et al. | 382/254 |
| 5,790,188 A | 8/1998 | Sun | 348/144 |
| 5,991,444 A | 11/1999 | Burt et al. | 382/232 |
| 5,999,662 A | 12/1999 | Burt et al. | 382/284 |
| 6,075,905 A | 6/2000 | Herman, et al. | 382/284 |
| 6,078,701 A | 6/2000 | Hsu et al. | 382/294 |
| 6,201,897 B1 * | 3/2001 | Nixon | 382/248 |
| 6,442,298 B1 | 8/2002 | Nixon | 382/248 |
| 6,571,024 B1 * | 5/2003 | Sawhney et al. | 382/294 |

* cited by examiner

Primary Examiner—Jayanti K. Patel
Assistant Examiner—Abolfazl Tabatabai
(74) Attorney, Agent, or Firm—Stoel Rives LLP

(57) ABSTRACT

A computer-implemented method and system for use in alignment of multiple digital images to form a mosaic image involves selecting multiple search site points (SSPs) in an overlapping area of a pair of the digital images and searching for an interesting point (IP) near each of the SSPs. The system involves the calculation of a numeric interest measure (IM) at each of multiple IP-candidate sites near the SSPs. The IM is indicative of the presence of image features at the IP-candidate site and provides a basis for comparing the IP-candidate sites at each of the SSPs and selecting the IP-candidate site having the most significant IM. In a preferred embodiment, IP-candidate sites having an IM that does not exceed a predetermined minimum threshold are discarded. The method also involves locating a tie point (TP) on an overlapping one of the digital images correlating to the IP. The TP together with the IP comprise a tie point pair (TPP) that can be used to calculate and apply geometric transformations to align the images and thereby form a seamless mosaic. The system and method may also involve radiometric balancing of the images to reduce tonal mismatch.

23 Claims, 9 Drawing Sheets

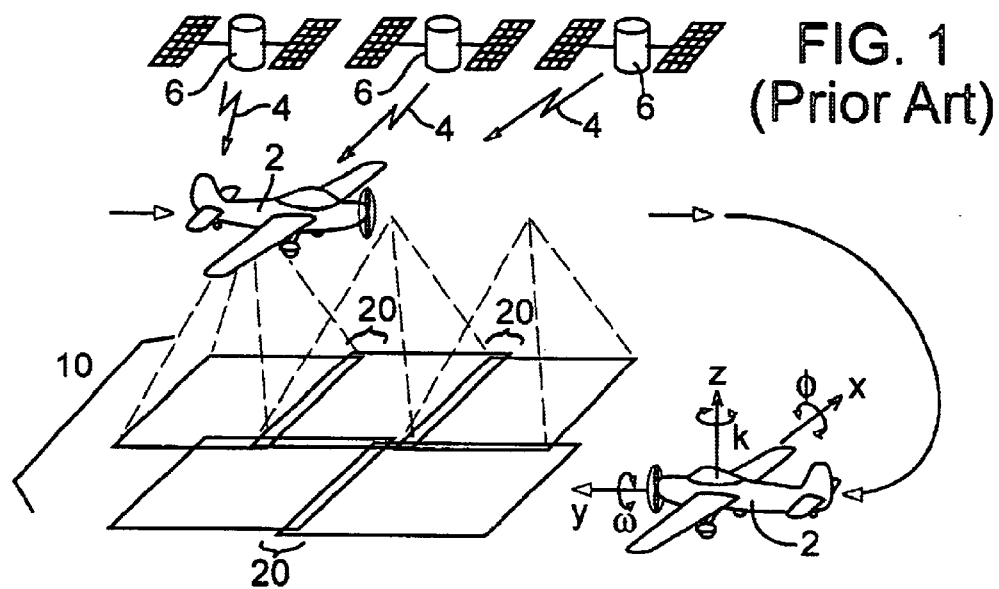
FIG. 1
(Prior Art)
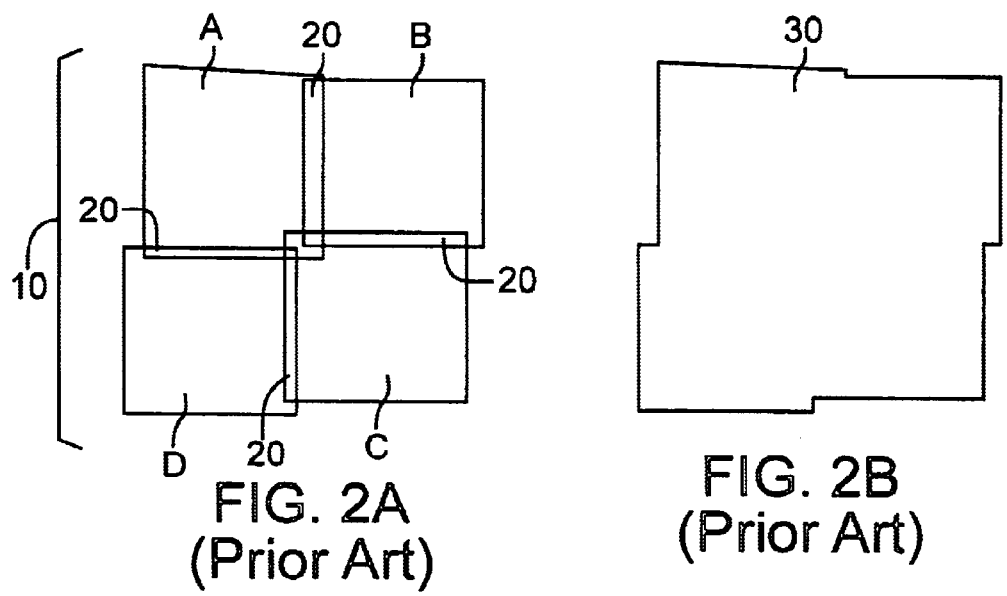
FIG. 2A
(Prior Art)
FIG. 2B
(Prior Art)

DIGITAL AERIAL IMAGE MOSAIC METHOD AND APPARATUS

RELATED APPLICATIONS

This application claims the benefit of U.S. Provisional Patent Application No. 60/166,551, filed Nov. 19, 1999, which is incorporated herein by reference.

TECHNICAL FIELD

This invention relates to methods and systems for geometric alignment of overlapping digital images and, specifically, to a computer-implemented method of creating, from a set of component images, a single, seamless composite image of the entire area covered by the set of component images. The method of the present invention has particular applicability to vertical-viewing aerial imagery, but can also be applied to other types of imagery.

BACKGROUND OF THE INVENTION

In earth imaging operations, a set of images is typically acquired from an airplane or satellite in earth orbit using an image acquisition system. The image acquisition system may include a digital camera capable of capturing multispectral or hyperspectral single frame images. Alternatively, the images may be captured by other methods, for example, by conventional film aerial photography, later scanned to create digital images. Multispectral images comprise pixel intensity data in up to 10 spectral bands (e.g., red, green, blue, and near-IR) with relatively broad bandwidth (25 to 150 nm), while hyperspectral images comprise data for a larger number of spectral bands (typically numbering in the hundreds) with a narrow bandwidth (typically 1 to 10 nm).

Each image is defined by an image data record comprising a three-dimensional pixel data array, with X columns of pixels and Y rows of pixels for each of n spectral bands. The image data record is captured by the digital camera and stored on a computer-readable storage device, such as a disk drive or memory card. Typical digital images may be 1000 pixels×1000 pixels in 7 spectral bands, or 4000 pixels×4000 pixels in 4 spectral bands, or even 9000 pixels×9000 pixels in a single spectral band ("black and white" or panchromatic).

For example, FIG. 1 shows an aircraft 2 carrying a prior art image acquisition system such as the ADAR System 5500 sold by the assignee of the present invention, Positive Systems, Inc., Whitefish, Mont. A GPS receiver of the image acquisition system (not shown) utilizes signals 4 from GPS satellites 6 in earth orbit to accurately determine the position and altitude of the aircraft 2. The angular orientation of the aircraft 2 (and, consequently, the image acquisition system) may also be measured by a gyroscope or accelerometer subsystem, which is integrated with the GPS receiver in an inertial measurement unit ("IMU"). Orientation is typically indicated by three angles measured by the IMU, namely, Phi ($\phi$), Omega ($\omega$), and Kappa (K) which represent angular displacement about the respective X, Y, and Z axes, where X is parallel to the aircraft wings, Y is parallel to the aircraft body, and Z runs vertically through the aircraft. Although not typical, the position and orientation data could easily be recorded in a coordinate reference frame other than the Cartesian coordinate system. For example, position and orientation data can be recorded in a polar coordinate frame of reference. Digital image data is often acquired by time-interval photography and stored by the image acquisition system in association with contemporaneous position, orientation, and timing data. To increase accuracy, the position and orientation data is collected from the GPS receiver (or an alternative source such as a GLONASS receiver, a LORAN receiver, manual data entry, etc.) at the same moment when the image is captured. GPS-sensed position, altitude, and orientation data is not required, but can aid in automation of the mosaicking process, as described below.

FIG. 1 illustrates the sequential acquisition of a set of digital images 10 such that the images 10 overlap to ensure complete coverage of the area being imaged and to provide a basis for alignment of the images 10 relative to each other. FIG. 2A depicts four adjacent images A, B, C and D that include overlapping regions 20. FIG. 2B depicts a composite image called a mosaic 30 that depicts the surface area covered by the set of adjacent images A–D (FIG. 2A). Commercially available GPS equipment and orientation sensors are not capable of measuring position, altitude, and orientation with sufficient accuracy for the creation of the mosaic 30 so that no visible image alignment errors are present. Therefore, to provide a geometrically seamless mosaic 30, the adjacent images A, B, C and D must be manipulated to reduce misalignment. Further, a truly seamless mosaic must be adjusted radiometrically to ensure a uniform image brightness at the overlapping boundaries of the image frames.

Automated prior art methods of facilitating the alignment of overlapping images to form a mosaic are computationally intensive because they require correlation calculations to be made at a large number of locations in the subject images. Conversely, the amount of computation required can be reduced by limiting the number of locations where the correlation coefficients are calculated, but not without affecting the quality of the resulting image alignment.

For example, U.S. Pat. No. 5,649,032 of Burt et al. describes a method of automatically creating a mosaic image from multiple, overlapping still images captured by a video camera. Image alignment may be performed in batch, recursive, or hierarchical modes involving generation of the mosaic from a "pyramid image" by first tiling a subset of the component images in coarse alignment, then progressively improving alignment of the tiled images by calculating affine transformations at progressively greater resolution. This method does not involve selection of possible tie point locations based on whether the image data at a location on a subject image is likely to have a matching location on a target image. Rather, the method involves searching for matching locations on the target image regardless of the quality of the image data at the corresponding location of the subject image.

U.S. Pat. No. 5,187,754 of Currin et al. describes a method of forming a composite, image mosaic from aerial photographs with the aid of an overview image obtained, e.g., by satellite. Tie points or ground control points are painstakingly identified manually by an operator using a computer mouse. Overlapping images are then automatically aligned by a tie point correlation method. The method does not involve automated selection of possible tie point locations.

U.S. Pat. Nos. 5,528,290 of Saund et al. and 5,581,637 of Cass et al. describe a system for creating a composite, mosaic image of a classroom whiteboard using a motorized camera pivotally mounted at a fixed location relative to the whiteboard. The camera pivots to capture multiple overlapping image frames, which are transmitted for reassembly at a viewing location. Landmarks projected or marked on the whiteboard in locations where the image frames overlap are selected using a gradient analysis applied at all pixel locations in the overlapping region of the images. Images are then aligned on a "board coordinate system" frame of reference by applying a weighted perspective distortion correction based upon a significance factor of the landmarks identified. This method is computationally expensive because it requires each pixel location in the overlapping area to be analyzed for the presence of a landmark. It would not be suitable for aerial imaging applications in which greater numbers of images at a much higher resolution than a video camera must be aligned accurately relative to geographic coordinates to form seamless mosaic images.

Thus, a need exists for a more efficient method and system of selecting tie point pairs in overlapping images for use in aligning the overlapping images to form a mosaic image. Methods suitable for use in aerial image processing applications are also needed.

SUMMARY OF THE INVENTION

In accordance with the present invention, a method of automatically creating mosaic images is implemented in a computer usable medium. The method involves obtaining a plurality of images including overlapping areas, identifying one or more a search site points (SSPs) in the overlapping areas, and calculating a numeric interest measure (IM) indicative of the presence of image features at the SSPs. If the IM exceeds a predetermined threshold, the system proceeds with a search in an overlapping image for a tie point (TP) correlating to the IP. The TP together with the IP comprise a tie point pair (TPP) that can be used to calculate and apply geometric transformations to align the images and thereby form a seamless mosaic.

Each point on a subject image at which IM is calculated is known as an interesting point candidate site (hereinafter "IP-candidate"). The system may calculate an IM of more than one IP-candidate within a predefined search window surrounding the SSP. The IMs calculated for the IP-candidates within a particular search window are compared to identify the IP-candidate at each SSP with the greatest IM, and thus, the greatest likelihood that features at the IP-candidate will yield good tie point pairs (both in the subject image and an overlapping target image).

The system may be of separable or modular design to facilitate its operation in an enhanced computing environment, such as a multithreaded processing environment, a multi-processor computer, a parallel processing computer, a computer having multiple logical partitions, or by distributed processing methods. In a preferred embodiment, the system and method also performs radiometric balancing of the images to reduce tonal mismatch.

Additional aspects and advantages of this invention will be apparent from the following detailed description of a preferred embodiment thereof, which proceeds with reference to the accompanying drawings.

Glossary of Terms

As used in this application, the following terms shall be given the meanings defined below, unless the context indicates otherwise:

Bidirectional reflectance: A property of an object relating to the variation in apparent brightness of light reflected from the object as a function of the angle from which that reflected light is observed. Stated differently, given a uniform source of illumination, any object will appear to reflect different amounts of the incoming light depending on the angle between the incoming light source, the object, and an observer of the object.

Datum: An ellipsoid representing a reference surface of the earth. When creating maps, it is typical to reference all ground elevations to a reference elevation other than sea level. The reference elevation of the datum may be significantly higher than sea level. See also Ellipsoid.

DEM/DTM: A digital elevation model (DEM) or digital terrain model (DTM) is a raster representation of the elevation or terrain of an area, with the raster values representing the height of the surface of the earth either above sea level or some other ellipsoid.

Downsampling: A method for viewing or analyzing an image at a reduced resolution compared to the original image. For example, given an image 1000×1000 pixels in size, a "downsampled" image 100×100 pixels in size may be created by averaging every 10×10 pixel area to create a single pixel representing the average value of the 100 pixels in the 10×10 area. This downsampled image represents the original image, but with reduced resolution and scale. If the original image had a ground sample distance of 1 meter per pixel, the downsampled image would show the same image but at 10 meters per pixel. An advantage of downsampling is it reduces both the amount of memory required to store and process the image (including volatile memory and nonvolatile memory such as disk storage) and the number of computer processing cycles required to analyze the image.

Ellipsoid: An ellipsoid is the mathematical representation of the earth, which is in fact not spherical but slightly flattened at the poles. See also Datum.

Geometric properties: The spatial information contained in an image, such as the ability to make geometric measurements between points shown in an image.

Map projection: The mathematics used to project an area of the earth, which is a near-spherical surface, onto a flat surface (i.e., a paper or electronic map) and to provide the definition for the projection of that map. Typical map projections include conical surfaces or cylindrical surfaces onto which the spherical earth is projected.

Monochromatic: An image of simple brightness values within a specific spectral band (color hue), including black and white images. See also Panchromatic.

Mosaic: A compilation of multiple images into a single larger image.

Multispectral/Hyperspectral: Imagery which includes multiple views of the same area on the ground, but with each view representing a different color, each represented (or stored) as an individual monochromatic image. Multispectral typically refers to imagery containing from four to approximately ten spectral bands, whereas hyperspectral data refers to imagery which may have dozens to hundreds of spectral bands.

Optical vignetting/Vignette effect: A common effect observed within any image, whether captured by an electronic sensor or film. The vignette effect is a simple darkening of the image as a function of distance from the center (i.e., the corners of the image appear darker than the center).

Panchromatic: A term from the film industry that typically refers to black and white images recorded with either film or a digital sensor sensitive to light in the full visible spectrum (approximately 400 nm to 700 nm).

Pixel: An abbreviation for "picture element." A pixel is the smallest unit of light information within an image that is displayable on an electronic screen (such as a video screen) or transferable to physical media (such as a hard copy print of a digital image).

Radiometric: A general reference to brightness or intensity values in an image (as opposed to "geometric," which refers to the spatial information in an image).

Raster: A method of displaying image information on a two-dimensional grid in which each point of the image grid is represented by one raster value. The digital values of each point on the grid are stored as pixels so that, when displayed on a computer screen, they appear as an image to the human eye. See also DEM/DTM.

Rectify/Rectification: An image is "rectified" when it is geometrically adjusted to enlarge or reduce the size of the image or a portion of the image, or to make curved lines appear straight or straight lines appear curved. Rectification performed as part of the mosaicking process involves adjusting the image geometry such that each pixel represents the same amount of area on the ground, and so that the geographic coordinates (latitude and longitude) of each pixel are known, to some limited degree of accuracy.

Remote Sensing: The use of aerial or satellite imaging to collect information about material properties (vegetation, soil, minerals, oceans, etc.) of a land area for later analysis by electronic sensors or other types of devices.

Resampling: A fundamental step in the rectification or transformation process. The mathematical transformation of an image from its current geometric state to another creates a new set of X,Y coordinates for each pixel in the original image. When any pixel in the new coordinate system (new image) lands outside a perfect X,Y location, the pixel values must be re-sampled to determine the appropriate brightness value of the new output pixel. The two common resampling algorithms are referred to as "bilinear interpolation" and "nearest neighbor." In nearest neighbor, the new pixel value is taken to be identical to be original pixel which is nearest to that new pixel location. The advantage of nearest neighbor resampling is that no pixel values are altered. In the case of bilinear interpolation, the new pixel value is a linear average from the original pixels above, below, left, and right of the new pixel. The advantage of bilinear interpolation is a smoother appearance in the output image, but since pixel values are altered, this algorithm is less desirable if quantitative radiometric analysis will be performed on the imagery.

Scan (scanned image): When a hard copy image (photograph) is placed on an electronic instrument and turned into a digital image this is referred to as "scanning" the image.

Tie points: Pixels of two or more separate images which correspond to the same feature of an area shown in the images. Tie points are used to form a mosaic image.

Transformation: See Rectification.

Warp: Layman's term for the action of geometrically rectifying or transforming an image.

BRIEF DESCRIPTION OF THE DRAWINGS

FIG. 1 illustrates the sequential acquisition of a set of overlapping digital images using prior art aerial photography methods.

FIG. 2A shows a set of overlapping images captured in accordance with the prior art aerial photography method of FIG. 2;

FIG. 2B shows a composite mosaic image generated from the set of overlapping images of FIG. 2A;

DETAILED DESCRIPTION OF PREFERRED EMBODIMENTS

In a preferred embodiment, the invention comprises a method implemented in computer software ("the system"), which can be stored on a computer-usable medium. Preferably, the system is designed to be operated on a personal computer (PC). However, as described below, the system is of a modular design that facilitates its use in an enhanced computing environment, such as a multithreaded processing environment, a multi-processor computer, a parallel processing computer, a computer having multiple logical partitions, or by distributed processing methods in which the system's processes are divided between many computers communicating over a network such as the Internet.

Figure 3:
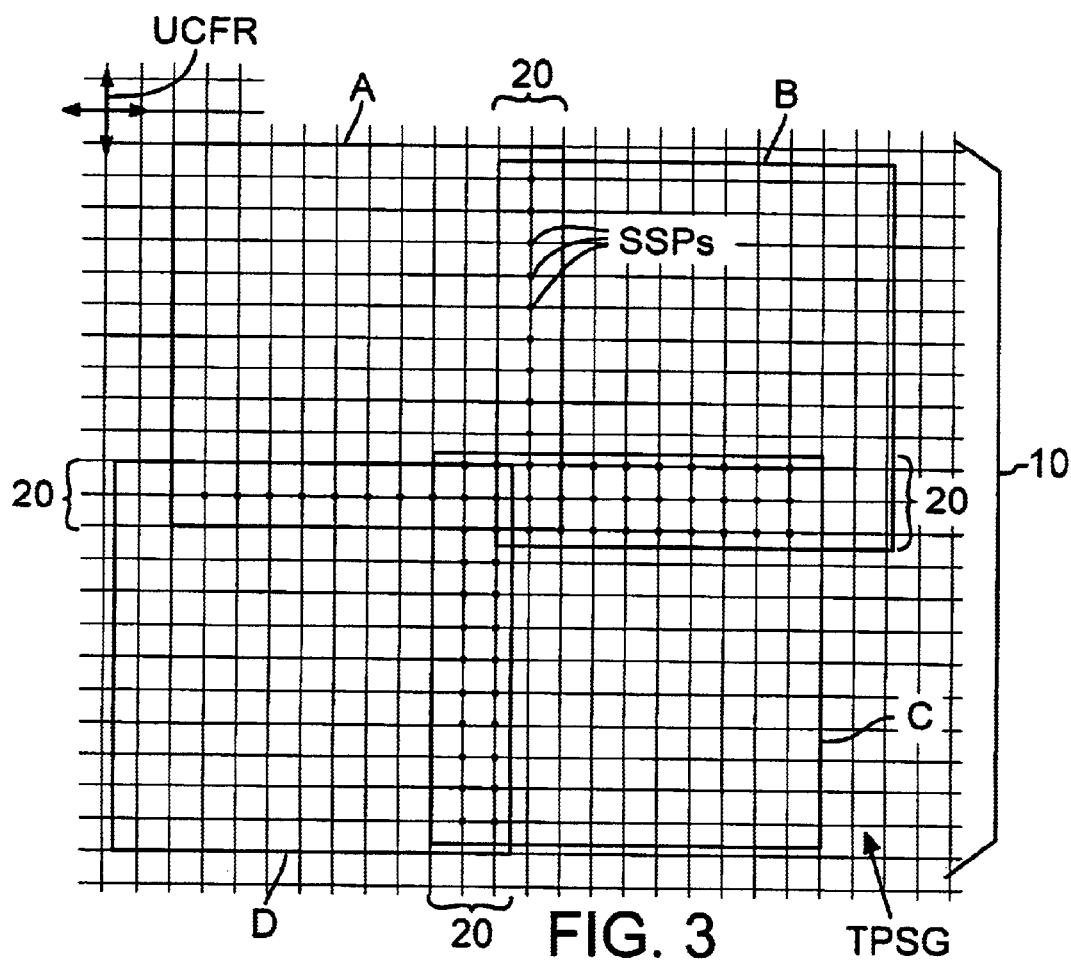
FIG. 3 shows a set of overlapping images mapped to a universal coordinate frame of reference (UCFR) to identify search site points (SSPs) within the overlapping areas of the images.

For clarity, the following description of a preferred embodiment and alternative embodiments refers to an example mosaic of only four images A, B, C, and D, as shown in FIG. 3. However, those skilled in the art will recognize that the method and system of the present invention can be used to create mosaics comprising a much larger number of overlapping images (eg, hundreds or thousands), as well as mosaics comprising as few as two images. The size of mosaic that the system is capable of creating is limited only by the amount of memory and non-volatile data storage space of the computer on which the system is implemented.

Figure 4:
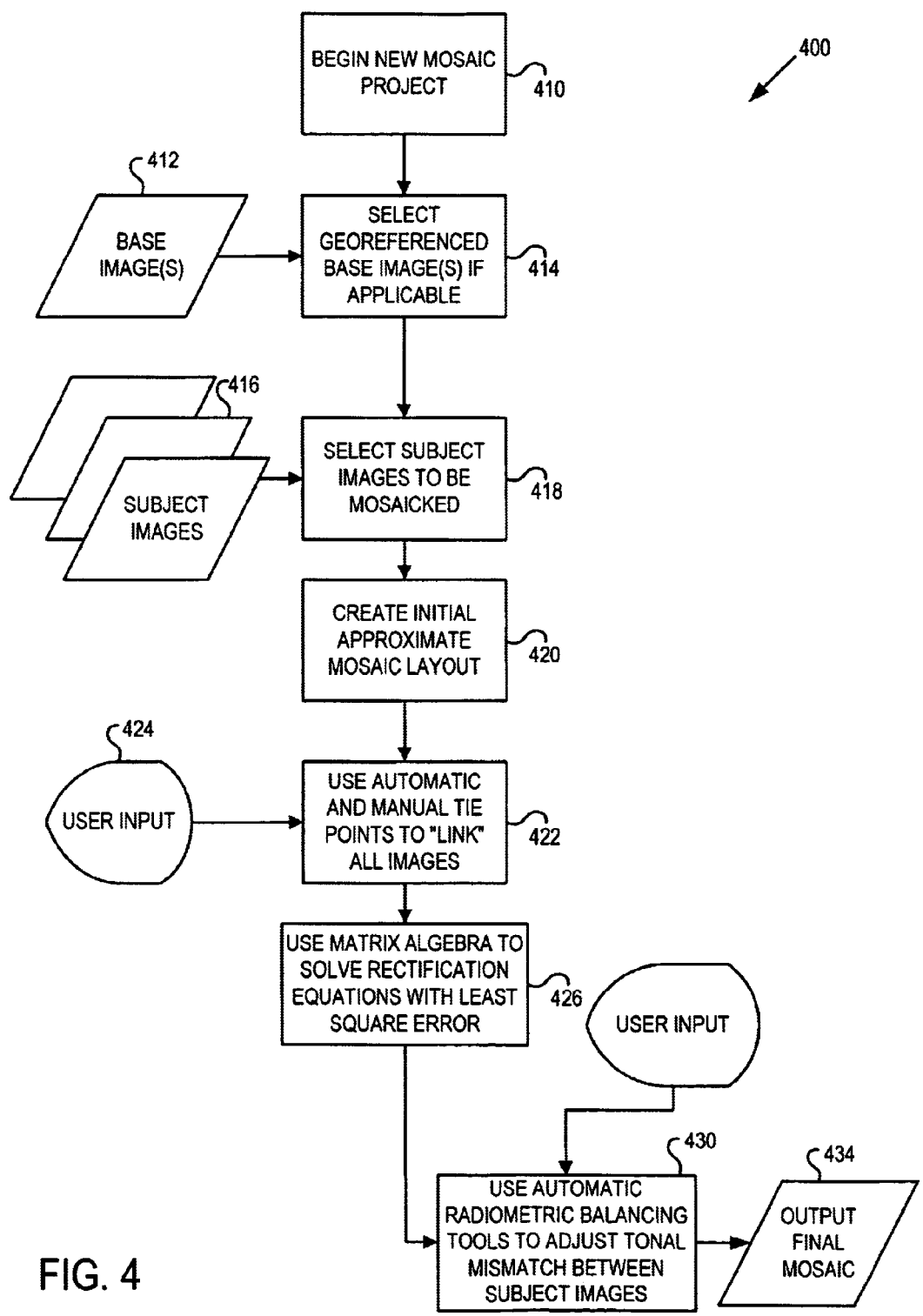
FIG. 4 is a flow diagram depicting an overview of a method and system for automatically aligning the overlapping images of FIG. 3 in accordance with a preferred embodiment of the present invention.

FIG. 4 shows a flow diagram depicting an overview of the method and system 400 in accordance with the preferred embodiment of the present invention. With reference to FIG. 4, a user of the system begins a new project (step 410) by selecting overlapping subject images 416 to be mosaicked (step 418). Images 416 may be selected from a database, a CD-ROM, a magnetic media disk drive, or from any other computer-readable data storage or transmission device. If available, one or more georeferenced base images 412 are also input into the system in a similar manner 414. An initial, approximate arrangement of the images is created 420, either from georeferencing data stored in association with images 416, or by rough manual arrangement. The system then automatically identifies likely tie points (step 422) and displays the tie points via a graphical user interface of the system for approval by the user (user input step 424). Based on the approved tie points, the system uses matrix algebra to solve rectification equations with least square error (step 426) to define the geographic transformations needed to align images 416. Finally, the system performs automatic radiometric analysis and balancing of the images (step 430) to adjust pixel intensity of the images and thereby reduce non-geometric mismatch between the subject images 416. The geometric and radiometric transformations developed by the system can then be applied to the subject images 416 to create an output mosaic 434.

Figure 5:
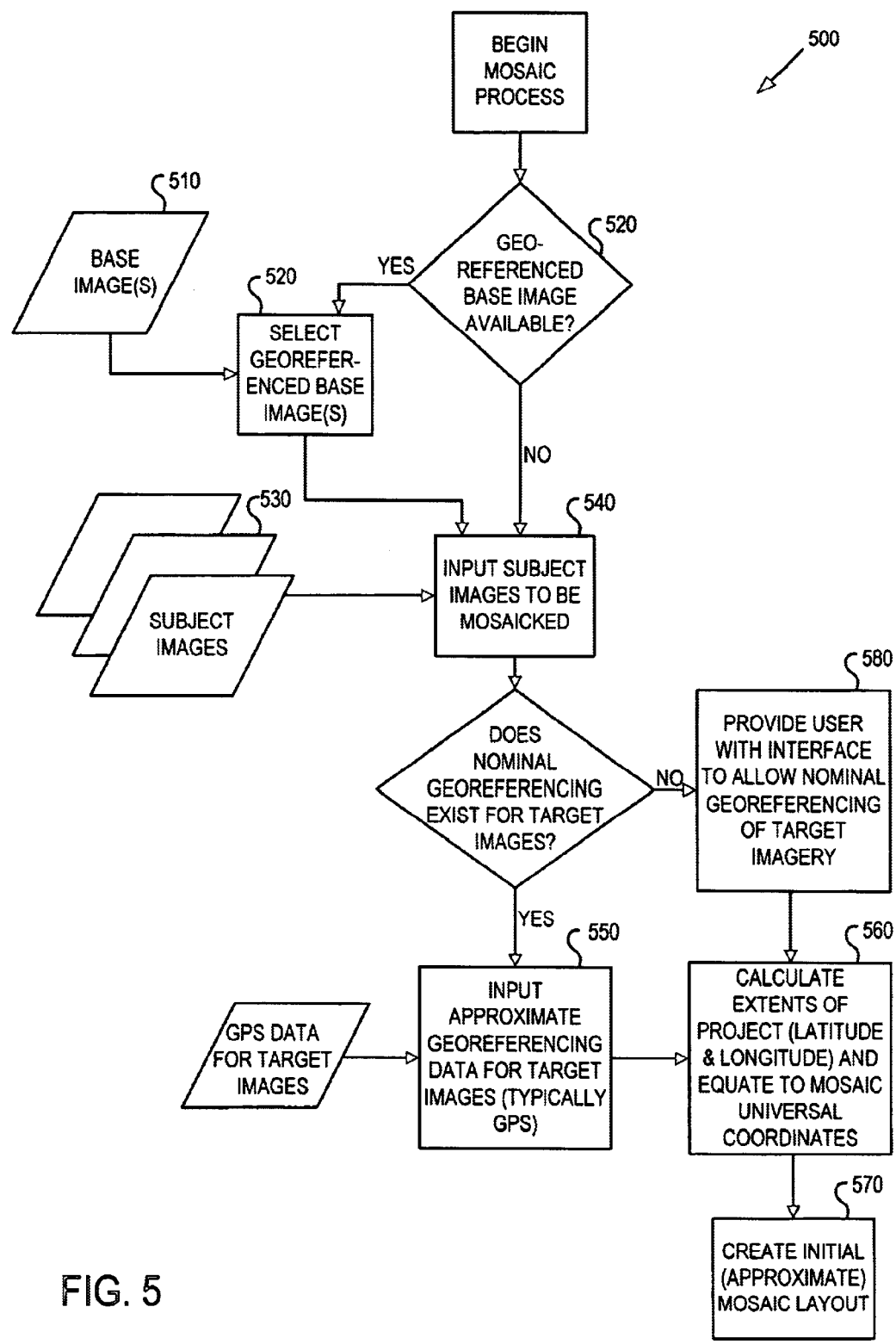
FIG. 5 is a flow diagram depicting the steps involved in creating an initial, approximate mosaic layout of the overlapping images of FIG. 3.

FIG. 5 is a flow diagram depicting the steps involved in creating the above-described initial, approximate mosaic layout 500. With reference to FIG. 5, if one or more base images 510 exist, they may be selected for use in the mosaicking process (step 520), along with the target images 530 (step 540). When nominal georeferencing data or GPS data related to the target images 550 is available, the system automatically calculates the extent of the mosaic to be created (step 560) and an initial mosaic layout (step 570). Otherwise, the user is prompted to arrange the images roughly or to input nominal georeferencing data (step 580) before the initial mosaic layout is created (step 570).

FIG. 3 shows raw images A, B, C, and D referenced by the system to a universal coordinate frame of reference (UCFR) based upon all available georeferencing information associated with the raw images. The UCFR is typically superimposed on a two-dimensional reference surface (a map projection), but could also be superimposed on an ellipsoidal datum surface when map projection is unacceptable to the end-user of the mosaic. Nominal georeferencing information may be associated with one or more of the individual raw images and may include one or more of the following: position data (X,Y,Z), sensor orientation data (K, $\phi$, and $\omega$) (FIG. 1), and digital elevation model (DEM) (or digital terrain model—DTM) data. The system of the present invention may include one or more tools for establishing an approximate orientation of the input images when absolutely no georeferencing information is associated with the raw images. Such tools may include a "drag and drop" graphical display, an interface for manual entry of approximate geographic coordinates, and an interface for input of simple orientation and spacing data.

Interesting Point/Tie Point Identification

Figure 6:
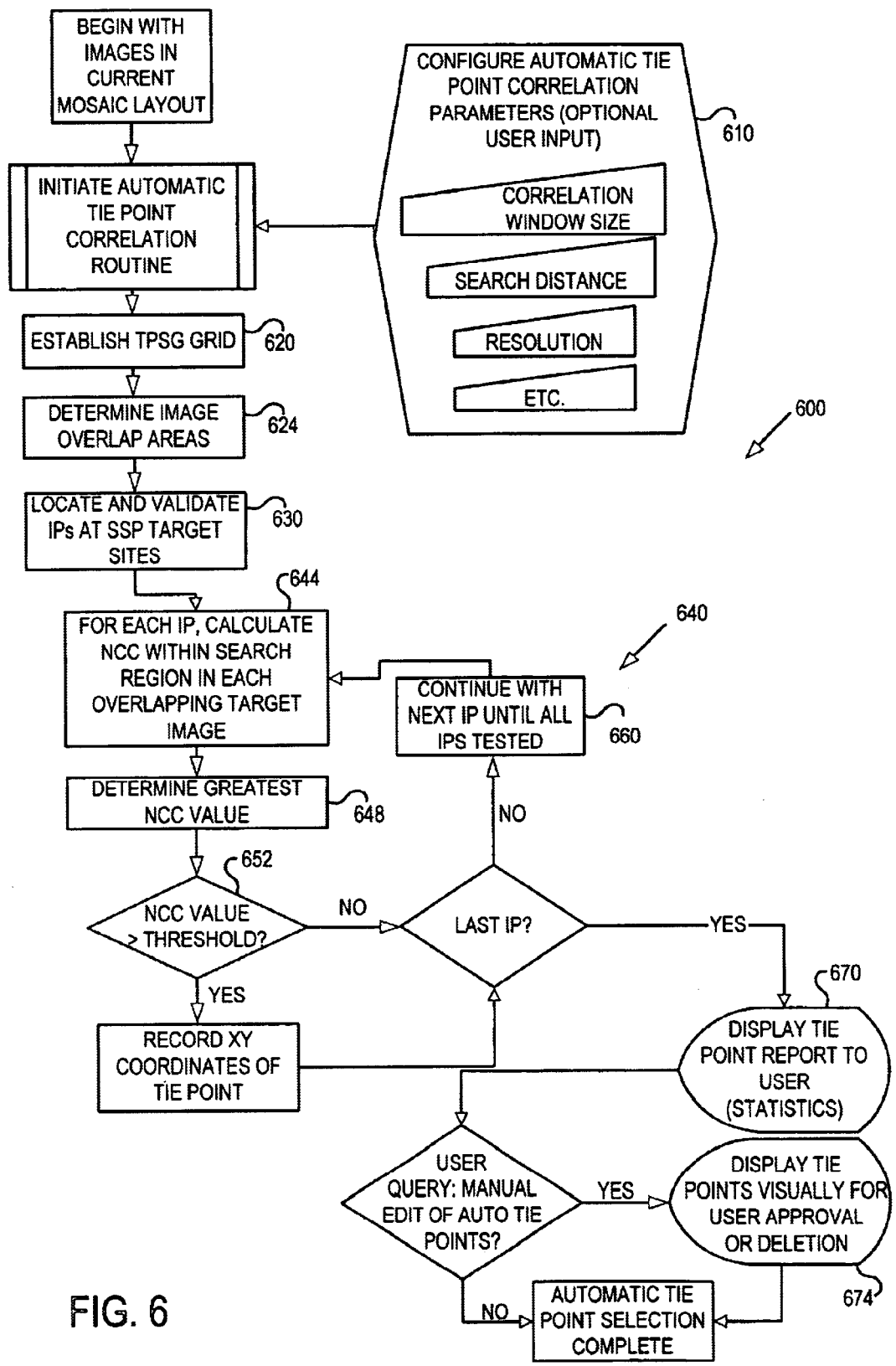
FIG. 6 is a flow diagram depicting an automated tie-point identification and correlation process performed for each SSP of each of the overlapping images of FIG. 3.

Following the initial orientation and layout of the images A–D, search site points (SSPs) are established by the system. FIG. 6 is a flow diagram depicting an automatic tie-point identification and correlation process 600 performed for each SSP. With reference to FIGS. 3 and 6, the user may be prompted by the system to input tie point correlation parameters, such as correlation window size, search distance, resolution, and others (step 610). Alternatively, the tie point correlation parameters may be predefined by default or may be selected from a menu of predefined parameter mixes for particular remote sensing applications, such as agriculture, forestry, wetlands, and steep terrain. A tie-point spacing grid (TPSG) is then defined as points spaced at regular intervals from the origin of the UCFR (step 620). In the preferred embodiment, the TPSG is a regular two-dimensional grid. In an alternative embodiment, the TPSG may comprise nonuniformly spaced points rather than a regular grid. Next, the system identifies all of the TPSG points that fall within overlapping regions 20 of the images A–D (step 624) and designates the TPSG points as search site points (SSPs).

To reduce system memory and computing power requirements, the density of the TPSG is preferably much less than the pixel resolution of images A, B, C and D (nominally one TPSG point per 50 linear pixels, but possibly from 1:1 to 1:100 or more). A high-density TPSG will produce a more accurate mosaic, but at the expense of increased processing time. The TPSG may be made adjustable to allow the user to achieve a balance between the accuracy of the mosaic and the time required to create it.

After designating certain TPSG points as SSPs (because they fall within at least two images), the system next analyzes candidate pixels ("IP-candidates") near each SSP for possible use as a tie point (TP) (See Glossary) (step 630). For each IP-candidate analyzed, he system calculates an interest measure (IM) indicative of whether the IP-Candidate is in proximity to distinctive features of the image that are likely to yield a successful tie point pair.

Figure 7:
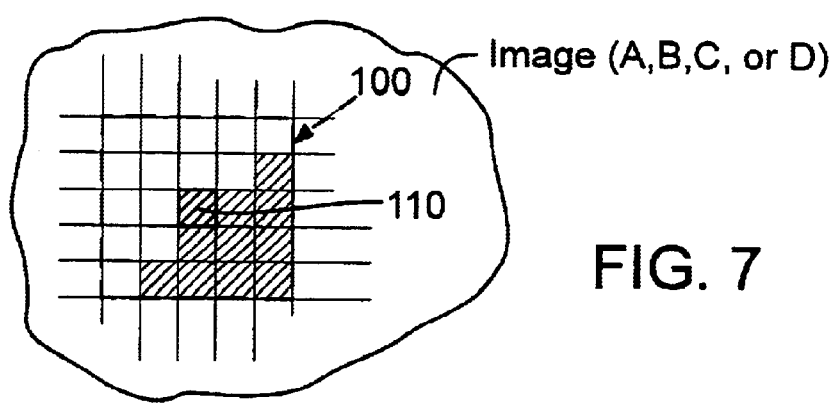
FIG. 7 depicts a "patch" of pixels centered on a tie point candidate pixel to be analyzed in accordance with the automated tie-point identification process of FIG. 6.

FIG. 7 depicts a "patch" 100 of pixel data centered on a IP-candidate 110. With reference to FIG. 7, the system analyzes patch 100 to determine the IM of IP-candidate 110. Various algorithms can be applied to calculate the IM. A preferred algorithm is described below with reference to FIGS. 9 and 10.

Figure 8:
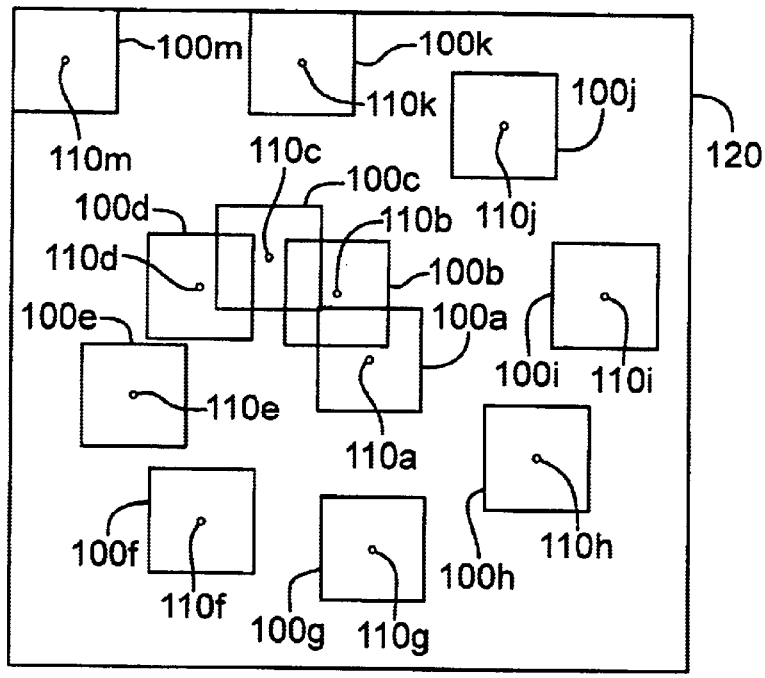
FIG. 8 illustrates a possible search routine in which patches within a search window centered of the SSP of FIG. 3 are analyzed to locate the tie point candidate with the greatest interest measure.

In a preferred embodiment search routine, the IP-candidates of each image A–D include the SSPs. However, the SSPs are not necessarily the only IP-candidates. The system preferably analyzes patches at multiple IP-candidates 110a–110m within a search window 120 around each SSP (FIG. 8). FIG. 8 illustrates one possible search routine applied within search window 120 to locate the IP-candidate with the greatest IM. The search window 120 may be of a size that is preset or user-configurable, but should be larger than patches 100a–100m, and preferably several times larger. Each patch 100a–100m at each IP-candidate 110a–110m comprises an n-pixel×n-pixel region (where n is an odd number 3 or greater, adjustable by the user). Those skilled in the art will understand that the patch size is limited only by the processing capacity of the computer on which the method is implemented, but acceptable results can be realized with reasonably small patches (sized between 3×3 and 25×25). For each IP-candidate 110a–110m, the system calculates an IM for the respective patches 100a–100m indicative of the contrast and distinctiveness of the features depicted in the patches. The system then selects the IP-candidate within each search window 120 with the greatest IM. As shown in FIG. 8, the search routine follows a spiral pattern. However, many other search routines are possible. For example, the search routine may be exhaustive by analyzing every pixel within the search window 120 as a IP-candidate. As previously noted, various algorithms may be applied to calculate the interest measure at each of the IP-candidates 100a–100m.

Interest Measure Calculation

Figure 9:
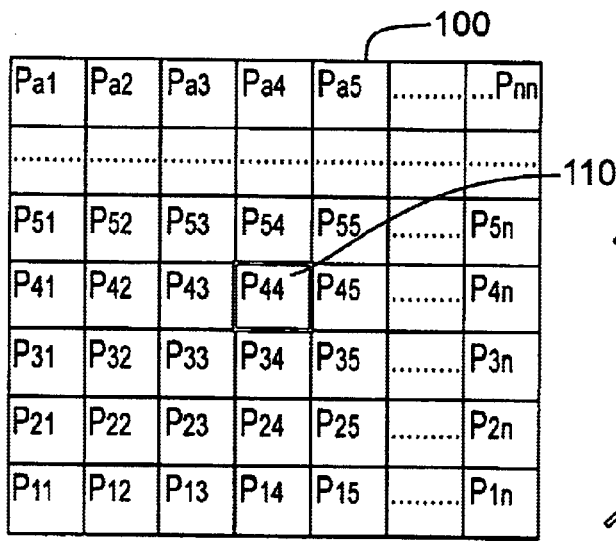
FIGS. 9 and 10 are diagrams showing a patch and directions of directional variances, respectively, illustrating the interest measure calculations of Equations 1a –1i.
Figure 10:
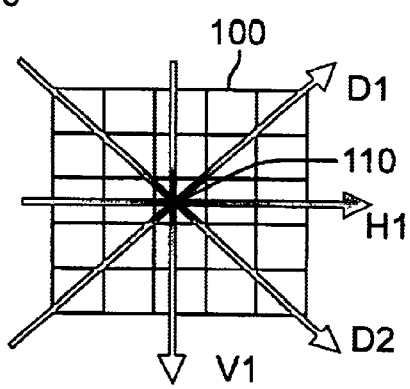

FIGS. 9 and 10 are diagrams illustrating an interesting measure calculation step as described above with reference to FIGS. 6 and 7. FIG. 9 is a diagram of an n×n patch 100 (where n must be an odd integer) centered on the IP-candidate 110 for which the interest measure IM is calculated in accordance with the preferred embodiment. FIG. 10 shows directions of directional variances associated with IP-candidate 110. With reference to FIG. 9, pixels $P_{1,1}$ to $P_{n,n}$ each have an associated intensity value. Equation 1i, below represents the interest measure IM of the IP-candidate 110, based on the directional variances of pixel intensity in the directions shown in FIG. 10. The directional variances used to determine the IM are calculated in accordance with equations 1a through 1h, as follows:

D1 directional variance:

$$\mu_{D1} = \frac{\sum_{x=1}^{n} P_{xx}}{n}$$

[1a] Mean $$SS_{D1} = \sum_{x=1}^{n} (\mu_{D1} - P_{xx})^2 = \sum_{x=1}^{n} \left( \frac{\sum_{x=1}^{n} P_{xx}}{n} - P_{xx} \right)^2$$

[1b] Sum of squares of differences

D2 directional variance:

$$\mu_{D2} = \frac{\sum_{x=1}^{n} P_{(n+1-x)x}}{n}$$

[1c] Mean
[1d] Sum of squares of differences $$SS_{D2} = \sum_{x=1}^{n} (\mu_{D2} - P_{(n+1-x)x})^2 = \sum_{x=1}^{n} \left( \frac{\sum_{x=1}^{n} P_{(n+1-x)x}}{n} - P_{(n+1-x)x} \right)^2$$

H1 directional variance:

$$\mu_{H1} = \frac{\sum_{x=1}^{n} P_{\left(\frac{n+1}{2}\right)x}}{n}$$

[1e] Mean
[1f] Sum of squares of differences $$SS_{H1} = \sum_{x=1}^{n} \left(\mu_{H1} - P_{\left(\frac{n+1}{2}\right)x}\right)^2 = \sum_{x=1}^{n} \left( \frac{\sum_{x=1}^{n} P_{\left(\frac{n+1}{2}\right)x}}{n} - P_{\left(\frac{n+1}{2}\right)x} \right)^2$$

V1 directional variance:

$$\mu_{V1} = \frac{\sum_{x=1}^{n} P_{x\left(\frac{n+1}{2}\right)}}{n}$$

[1g] Mean

[1h] Sum of squares of differences $$SS_{V1} = \sum_{x=1}^{n} \left(\mu_{V1} - P_{x\left(\frac{n+1}{2}\right)}\right)^2 = \sum_{x=1}^{n} \left( \frac{\sum_{x=1}^{n} P_{x\left(\frac{n+1}{2}\right)}}{n} - P_{x\left(\frac{n+1}{2}\right)} \right)^2$$

The interest measure (IM) is then the minimum value of the four directional variances, $SS_{D1}$, $SS_{D2}$, $SS_{H1}$, and $SS_{V1}$:

$$IM = \text{minimum} (SS_{D1}, SS_{D2}, SS_{H1}, SS_{V1}) \qquad [1i]$$

By selecting the minimum directional variance value, this algorithm identifies the directional component that has the least amount of "interest" at each IP-candidate.

Within each search window 120, the system rejects those IP-candidates with one or more poorly defined directional variances and selects the IP-candidate with the largest minimum directional variance. IP-candidates are also tested to ensure that their IM exceeds a predefined minimum threshold. In this way, the system avoids IP-candidates located at patches that are featureless or that include only simple edge features. Selecting the IP-candidate with a high IM increases the likelihood of success during the tie point correlation step, described below. IPs are then selected by the system as the subset of IP-candidates of each image having the highest IM values. Typically only one IP is selected for each SSP. Thus, each IP corresponds to a distinct SSP, but it is possible for the IMs of all of the IP-candidates at an SSP to fall below the predefined minimum threshold IM. Therefore, not all SSPs will yield an IP.

Tie Point Pair Matching

Figure 11:
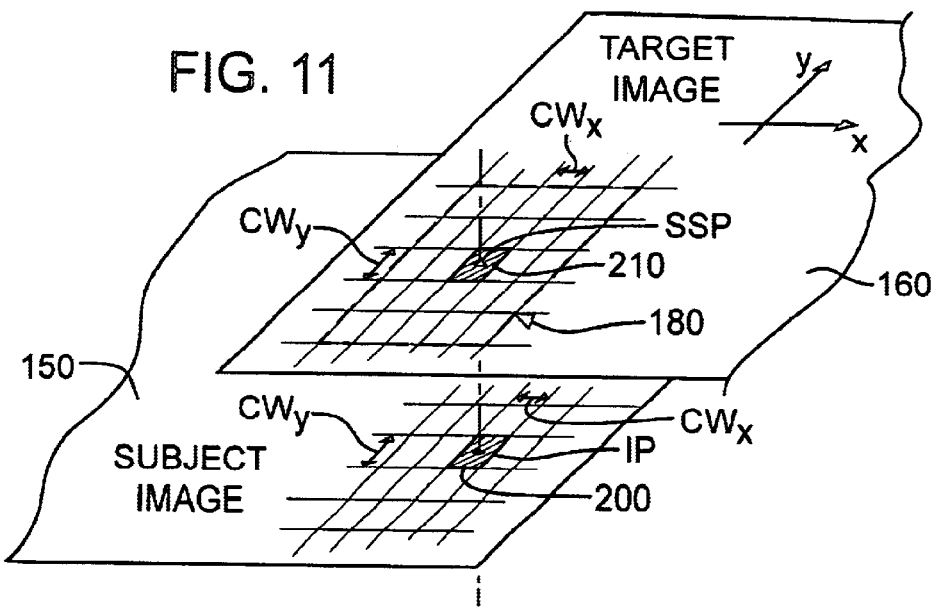
FIG. 11 is a pictorial diagram that illustrates a method of matching an interesting point of a subject image to a tie point of a target image to form a tie point pair.

FIG. 11 is a pictorial diagram that illustrates a method of matching a tie point (TP) with an IP to form a tie point pair TPP. With reference to FIGS. 6 and 11, in a tie-point matching method 640, the image containing the IP is referred to as a subject image 150 and the image overlapping the IP is referred to as a target image 160. For each IP, the system searches within a target search window 180 of each overlapping target image 160, to find a matching tie point (TP) (step 644). The target search window 180 is located at the SSP of the target image 160 that corresponds to the SSP of the subject image 150 associated with the IP. The system analyzes multiple locations within the target search window 180, following a search routine, in a manner similar to the IP search routine described above.

To test for a match, the pixels within a target correlation window 210 at each test point are compared to a subject correlation window 200 of the IP, for example, by calculating a normalized correlation coefficient (NCC) in accordance with equation 2:

$$NCC = \frac{\sum_{x=1}^{CW_x} \sum_{y=1}^{CW_y} [DN_{subject(x,y)} - \mu_{subject}] * [DN_{target(x,y)} - \mu_{target}]}{\sqrt{\sum_{x=1}^{CW_x} \sum_{y=1}^{CW_y} [DN_{subject(x,y)} - \mu_{subject}]^2 * [DN_{target(x,y)} - \mu_{target}]^2}} \qquad [2]$$

With reference to Equation 2, the NCC is a numerical measure indicative of the similarity of the target correlation window 210 to the subject correlation window 200. The subject and target correlation windows 200, 210 are sized the same, with $CW_x$ and $CW_y$ representing their x and y dimensions, respectively. DN is the pixel value or "digital number" representing the intensity of the pixels. The symbols $\mu_{subject}$ and $\mu_{target}$ represent the mean pixel intensity within the respective subject and target correlation windows 200, 210. Normalization (by the denominator in equation 2) compensates for differences in overall image brightness between the subject and target correlation windows 200, 210. Comparison tests other than the NCC equation (Equation 2) exist. For example, Fast-Fourier Transform and Wavelet Transform are both known correlation analysis functions.

The tested location within the target search window 210 that yields the greatest NCC value is selected as the matching tie point coordinate TP of a tie point pair (TPP) (of which the IP is the other half) (step 648). However, if the NCC does not exceed a predetermined correlation threshold, then the TPP is discarded (step 652). As with many other operational variables, the system allows the correlation threshold to be preset by the user.

The user may select from a variety of test point search algorithms, either to improve the speed at which TPPs are located or improve the accuracy of all selected tie points. For example, test points may be selected in a spiral pattern or at random locations within the target search window 210. If speed is important, the user may select a correlation algorithm that first downsamples (see Glossary) the imagery within the correlation search window 180 to allow testing for tie points at a reduced resolution. Other strategies for reducing processing time include applying a "hill climbing" technique to identify the maximum NCC value more quickly by searching in a direction in which increasing values of the NCC are located, ignoring areas of the search window toward which the NCC values are decreasing. Conversely, if accuracy is the most important goal, better accuracy may be achieved using a more thorough test point selection algorithm, for example an exhaustive comparison that tests at every pixel within the correlation search window 180.

The tie point matching process 644, 648, 652 is repeated (step 660) until an attempt to find a matching tie point is made for all of the IPs identified in the interesting point location routine 630. After all of the IPs have been processed, the system displays a report to the user (step 670) showing statistics on the TPPs.

Figure 12:
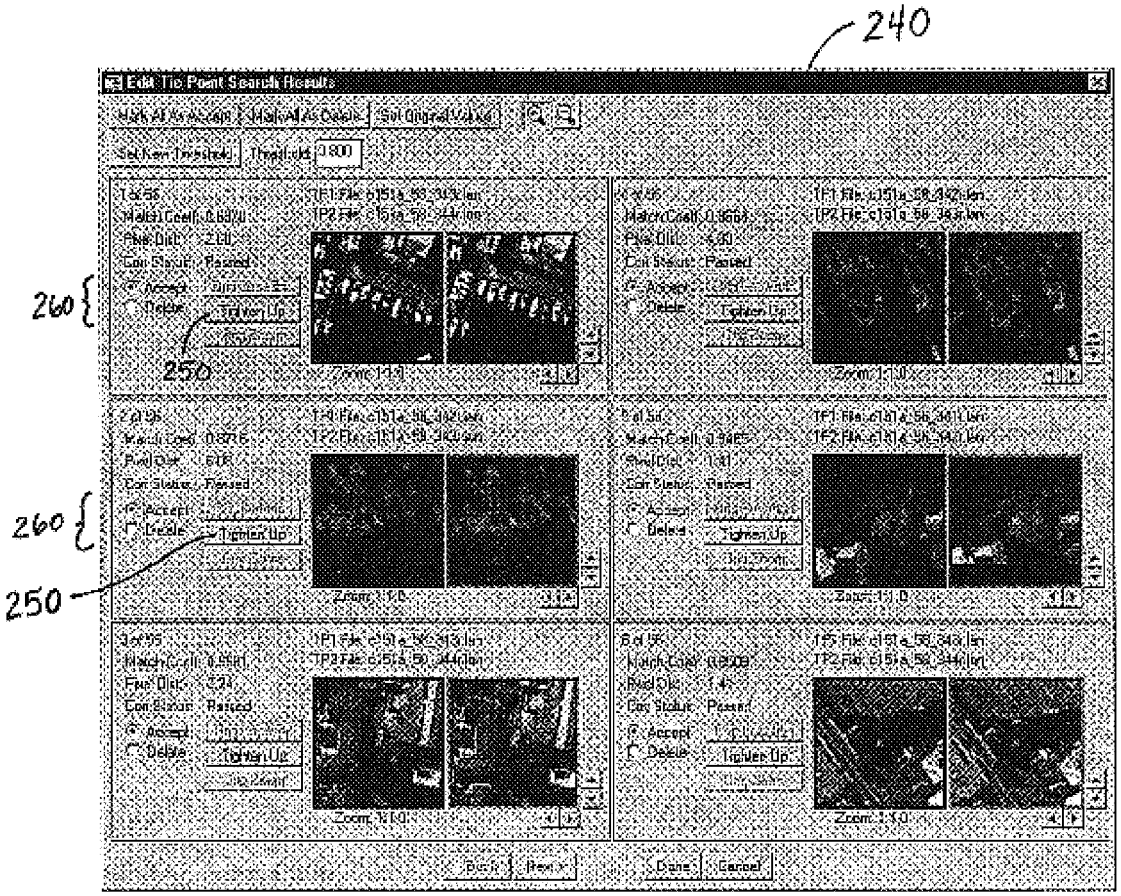
FIG. 12 is a graphical user interface for verifying automatically identified tie point pairs.

Following the tie point matching process, the user is given the option of editing, via a graphical user interface, the TPPs selected by the system (step 674). The user can approve any acceptable tie points (whether identified or rejected by the software), as well as reject any tie points the software erroneously identified as meeting the predetermined correlation threshold. FIG. 12 shows an example of an interface 240 for approving automatically matched TPPs. Selection of a "Tighten Up" button 250 of the interface repeats the interesting point selection and tie point matching procedures, starting at the current IP and TP locations of the respective subject and target images. Repeating the IP selection and TP matching process will often result in a more accurate TPP, which can then be approved for use in creating the mosaic. Approval or rejection of TPPs is indicated by selecting one of a pair of radio buttons 260 of interface 240. Approved TPPs are then used as a basis for aligning the images in accordance with either an edge mosaic procedure or a base image mosaic procedure, as described below.

Edge Mosaic

Figure 13:
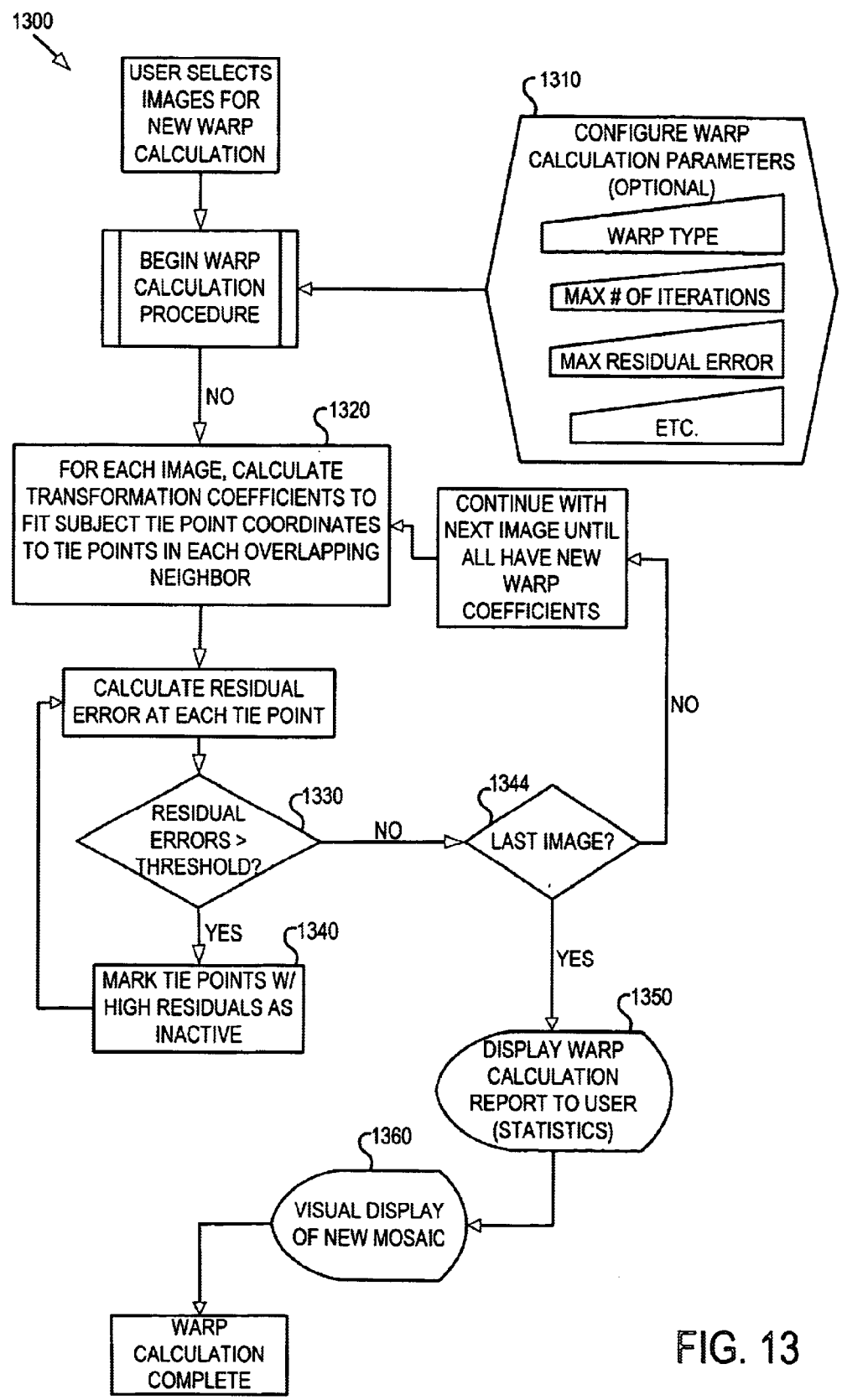
FIG. 13 shows a flow diagram of the steps performed to apply warp calculations.

In an edge mosaic operation, where no base image exists, the system must calculate transformation equations for all of the subject images. Ideally, the transformation equations will result in the least amount of misalignment throughout the mosaic. For each of the TPPs the system calculates the estimated target destination ($X_{out}$, $Y_{out}$) in the UCFR as the midpoint between the IP and TP of the TPP. Starting with the estimated target destinations of each TPP, the warp adjustment (also referred to herein as geometric adjustment or rectification) for aligning each image in the mosaic can then be determined by a least-squares fit method. FIG. 13 represents the steps involved in making the necessary calculations to determine the parameters for geometric adjustment 1300. The least-squares fit method involves solving a series of equations that define the transformation of an image from raw coordinates to UCFR coordinates. Examples of three such equations for use in a least-squares fit analysis are provided below as Equations 3–5. With reference to Equation 3 (3a and 3b), coefficients $a_1, a_2, \ldots a_{12}$ are calculated for each image frame (A–D) of the mosaic to define a unique rectification equation for each image frame. In other words, rectification equations are developed for each image for use in calculating a new output coordinate (UCFR coordinate) for each pixel of the image frame, based on input into the rectification equations of that pixel's raw coordinate.

Equations 3a and 3b represent a simple implementation of the method, with the rectification equations being second order polynomials. Alternative equations such as a projective transform (equation 4) or polynomial transformation function (equation 5) can also be used for image rectification, with the goal being to minimize the rectification error for each image.

$$Y_{out} = a_1 Y_{in} + a_2 X_{in} + a_3 Y_{in} X_{in} + a_4 Y_{in}^2 + a_5 X_{in}^2 + a_6 \quad [3a]$$

$$X_{out} = a_7 Y_{in} + a_8 X_{in} + a_9 Y_{in} X_{in} + a_{10} Y_{in}^2 + a_{11} X_{in}^2 + a_{12} \quad [3b]$$

$$Y_{out} = \frac{a_3 Y_{in} + a_4 X_{in} + a_5}{a_1 Y_{in} + a_2 X_{in} + 1} \quad [4a]$$

$$X_{out} = \frac{a_6 Y_{in} + a_7 X_{in} + a_8}{a_1 Y_{in} + a_2 X_{in} + 1} \quad [4b]$$

$$x = \sum_{j=0}^{M} \sum_{k=0}^{j} a_{jk} X^k Y^{j-k} \quad [5a]$$

$$y = \sum_{j=0}^{M} \sum_{k=0}^{j} b_{jk} X^k Y^{j-k} \quad [5b]$$

In equation 5a and 5b, the variable M represents the degree of the equation, with M=2 typically being sufficient.

The system accepts optional user input parameters 1310 for use in warp transformation. The system then calculates the transformation coefficients (e.g., $a_1, a_2, \ldots a_{12}$) for each TPP (step 1320), but rejects TPPs that have a high residual error (step 1340) in excess of a user-defined (or default) threshold 1330. Because the warp calculations necessary to determine the transformation coefficients involve independent linear equations solved using matrix algebra, the warp calculations for each TPP can be optimized for processing in a multithreading, multiprocessor, or parallel processor environment. Once warp calculations are complete for all images (step 1344), the system displays statistics to the user (step 1350). The warp transformation can then be applied to the raw images to create an output mosaic that can be stored in memory, displayed on the computer's display, and printed to a printer (step 1360).

Base Image Mosaic

Occasionally input imagery that is accurately georeferenced (by a method other than described above, e.g., by photogramrnetric methods) is available for use. In this special case, the imagery typically is provided with accurate geographic coordinate data for each pixel within the image (as defined by one of many common "map projections" which relate the rectangular coordinates of an image to latitude and longitude). With this already georeferenced imagery, image rectification is not necessary. Instead, these georeferenced images can be immediately joined into a mosaic. More importantly, such georeferenced images can serve as "base" images, providing visual reference points for georeferencing new overlapping imagery. In this scenario, the tie point selection process is carried out as described above, but image rectification processes are applied only to those images input without prior georeferencing information. In this manner, new images are georeferenced via matching ground features onto the existing base imagery.

Radiometric Adjustment

Brightness variations are common across an individual image frame. Further, the brightness can differ from one image frame to another, which can be especially evident in the overlapping region. Brightness variations can be caused by changes in the solar illumination based on the time of day or clouds obscuring the sun, as well as sophisticated and complex phenomena such as optical vignetting or bidirectional reflectance (see Glossary). Consequently, the creation of a mosaic that appears seamless to the naked eye often requires radiometric adjustments to be made to the images.

After the necessary geometric transformation equations have been defined (e.g., using the edge mosaic method or the base image mosaic method, as described above), but before geometric processing is performed, the images may be individually corrected for radiometric variations. Many techniques can be applied to correct or enhance the pixel intensity data within a mosaic. The system of the present invention may include one or more of various radiometric processing algorithms.

The simplest radiometric adjustment which may be applied to digital imagery is to adjust the histogram (overall brightness values) of each image in order to improve the visual appearance. The appropriate radiometric adjustments are applied uniformly to the entire image, and include features such as brightening, darkening, enhancing contrast, and color enhancement. Such tools are relatively common in the public domain, and are thus not described in detail here. The software system described in this patent application includes computer-aided tools to allow the user to make manual adjustments, as well as options for automated adjustments (to maximize contrast, for example).

Another simple radiometric adjustment is to apply histogram normalization, in which the statistics are calculated for the histogram of each image, after which adjustments are made to ensure that the mean (average) brightness value is the same for all images.

A slightly more sophisticated adjustment is histogram balancing, wherein the brightness of each image is adjusted based on the brightness of adjacent images such that overall brightness variations from one image to the next are minimized. In the simplest implementation, the adjustment applied to each image in this scenario would be a uniform histogram adjustment wherein all pixel values would be adjusted in the same manner (i.e., made brighter or darker by the same amount, to compensate for shadows caused by clouds, for example). In a more technically demanding application, the histogram balancing described here may be implemented as a spatially dependent adjustment to the image, applied in different amounts to different regions of the image, to compensate for the variable sun angle affects described in the next paragraph.

Figure 14:
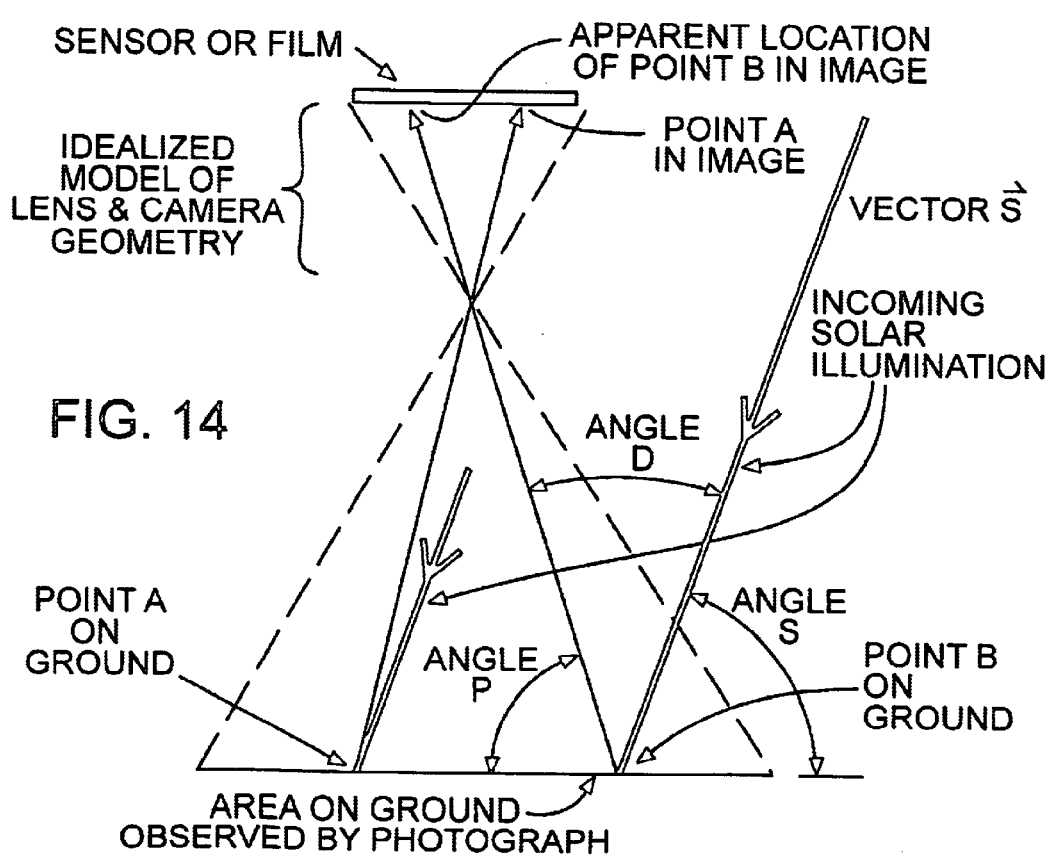
FIG. 14 is a schematic diagram depicting the phenomena of bidirectional reflection.

Proceeding to greater sophistication, information regarding the location (latitude and longitude) as well as date and time of each image is utilized by the software to calculate the instantaneous vector from the ground to the sun. With reference to FIG. 14, Angle S represents the angle of incoming solar illumination (Vector S). Given this angle S for a selected image, the variable angle from the sensor to each pixel on the ground is also calculated (Angle P), and the net angular change in illumination from the sun to the ground and into the sensor is then calculated (Angle D) by trigonometric methods. Based on knowledge of this differential angle across each image, a correction for bidirectional reflectance may be applied to each image, resulting in radiometric balancing across the entire mosaic.

Another algorithm is a content-based modifier which may be applied to accomplish radiometric balancing. The content-based modifier takes into account all of the above factors, as well as the actual content of the imagery. In this content-based algorithm, classic multispectral classification methods are applied, allowing the computer to recognize different ground cover types, such as grass, concrete, and water. The resulting spectral signatures are used to predict adjustments to the current radiometric model. For example, if the image content includes water surfaces, the bidirectional reflectance effect is dramatically different than if the imagery contains only vegetation. Urban features (such as buildings, concrete, asphalt, and automobiles) also have unique bidirectional reflectance distribution functions. When multispectral classification may be applied prior to finalizing the radiometric adjustment, different radiometric adjustments may then be applied to each region of the imagery, depending on the land cover type generally occupying that region of the image.

Algorithms used to adjust radiometric values of digital images may be applied prior to beginning geometric mosaic transformations or after geometric transformations are completed, depending on the cause of the radiometric problem being addressed.

Additional Advantages of the Invention

As described above, the system includes an interesting point test to pre-qualify potential tie point sites. The interesting point test significantly minimizes the amount of time spent searching for tie points in areas where image contrast is minimal. The software system also has the capability to remove the effects of optical (lens) distortion from each individual image prior to compiling those images into the mosaic.

The mathematics used for rectifying and radiometric balancing of imagery are designed to be "separable", both by function and on an image-by-image or pixel-by-pixel basis. Separable mathematics allows additional analysis modules to be added or removed from the system based on end-user requirements. Separable mathematics also provides performance benefits. For example, the amount of data manipulated and stored by the software system during processing is kept to a minimum. While the images of a project typically occupy thousands of megabytes, the volume of new data which is generated during the mosaicking process is relatively minimal, comprised entirely of mathematical coefficients for rectification of said imagery. The actual rectification is performed on the raw images in one final step (vs. many steps or incremental transformations) to insure that minimal distortions are imparted to the final mosaic. Rectification in a single final step also provides for maximum computational efficiency. Finally, the processing steps are applied to each individual image separably, thereby facilitating additional efficiencies when performed in a multithreading, multiprocessing, distributed processing, or parallel processing environment.

It will be obvious to those having skill in the art that many changes may be made to the details of the above-described embodiment of this invention without departing from the underlying principles thereof. The scope of the present invention should, therefore, be determined only by the following claims.

What is claimed is:

1. A computer-implemented method of identifying a tie point pair (TPP) for use in alignment of multiple digital images to form a mosaic image, the digital images including at least one overlapping area, the method comprising:
   selecting multiple search site points (SSPs) in the overlapping area of a first one of the digital images;
   searching for an interesting point (IP) near each of the SSPs, including:
   (a) at multiple IP-candidate sites near each of the SSPs, calculating a numeric interest measure (IM), the IM being indicative of the presence of image features at the IP-candidate site,
   (b) selecting one of the IP-candidate sites having the largest IM, and
   (c) if the IM exceeds a predetermined threshold, designating the IP-candidate site as an interesting point (IP); and
   locating on a second one of the digital images overlapping the first one of the digital images a tie point (TP) correlating to the IP, the TP together with the IP comprising a tie point pair (TPP).

2. The method of claim 1 in which the IM is indicative of the minimum directional variance at the IP-candidate site.

3. The method of claim 1, further comprising aligning the first and second digital images based on the TPP.

4. The method of claim 1, further comprising locating multiple TPPs.

5. The method of claim 4, further comprising aligning the first and second digital images based on the multiple TPPs to thereby form a mosaic image.

6. The method of claim 4, further comprising calculating a set of transformation coefficients for use in geographically transforming the first and second digital images and to thereby align the first and second digital images.

7. The method of claim 1, further comprising calculating a set of transformation coefficients using a least squares fit method for use in geographically transforming the first and second digital images and to thereby align the first and second digital images.

8. The method of claim 7, further comprising geometrically transforming the first and second digital images using the set of transformation coefficients to thereby generate a mosaic image.

9. The method of claim 1, further comprising automatically adjusting the radiometric properties of the first and second digital images.

10. The method of claim 1 in which the digital images include multispectral images.

11. A method for use in generating a mosaic from a set of images including at least a first image and a second image, the first image having an overlapping area that overlaps the second image, the method comprising:
   designating an IP-candidate site of the first image in the overlapping area;
   calculating a numeric interest measure (IM) indicative of the presence of image features at the IP-candidate site; and
   testing the IM to determine whether the IM meets a predetermined threshold; and
   if the IM meets the predetermined threshold, locating a tie point (TP) on the second image that correlates to the IP-candidate site.

12. The method of claim 11, further comprising:
   calculating the IM at multiple IP-candidate sites on the first image, the IP-candidate sites selected from a region of the first image within a predefined search window;
   selecting one of the IP-candidate sites having the maximum IM; and
   if the maximum IM exceeds the predetermined threshold, locating the TP correlating to said selected IP-candidate site.

13. The method of claim 12, further comprising, determining a set of transformation coefficients based on the selected IP-candidate site and the TP for use in aligning the first and second images.

14. The method of claim 13, further comprising aligning the first and second images based on the transformation coefficients to thereby form a mosaic image.

15. The method of claim 11, further comprising aligning the first and second images based on the IP-candidate site and the corresponding TP.

16. The method of claim 11, further comprising:
   identifying a plurality of SSPs in the overlapping area;
   calculating a numeric interest measure (IM) of each of multiple IP-candidate sites near each of the SSPs;
   for each of the SSPs, selecting one IP-candidate site having an IM exceeding the predetermined threshold; and
   searching in the second image for a TP corresponding to each of the selected IP-candidate sites.

17. The method of claim 16, further comprising:
   for each selected IP-candidate site, testing multiple TP-candidates on the second image to determine whether the TP-candidate correlates to the selected IP-candidate site and thereby identify the TP corresponding to the IP-candidate site.

18. The method of claim 17 in which the testing of TP-candidates includes calculating, for each TP-candidate corresponding to the selected IP-candidate sites, a numerical correlation coefficient indicative of similarities between the TP-candidate and the selected IP-candidate site; and, further comprising:
   selecting a predetermined correlation threshold; and
   discarding TP-candidates having a numerical correlation coefficient that does not meet the predetermined correlation threshold.

19. A computer software program stored on a computer-usable medium for use in generating a mosaic from a set of images including at least a first image and a second image, the first image having an overlapping area that overlaps the second image, the computer software program comprising:
   an initial alignment routine for roughly aligning the set of images;
   an interesting point identification routine for identifying at least one interesting points (IP) on at least a first one of the images; and
   a tie point matching routine for searching in at least a second one of the images for a TP correlating to the IP.

20. The computer software program of claim 19, further comprising:

a transformation calculation engine for calculating transformation coefficients based on the TP and the IP, the transformation coefficients representing geometric transformations necessary to align the images.

21. The computer software program of claim 20, further comprising:

a mosaic generation routine for applying the transformation coefficients to the images and to thereby generate a mosaic image.

22. The computer software program of claim 19, further comprising:

a radiometric adjustment routine for adjusting the radiometric properties of the images to thereby reduce tonal mismatch between the images.

23. The computer software program of claim 19, in which one or both of the interesting point identification routine and the tie point matching routine is separable from the remainder of the computer program to facilitate operation of the computer software program in an enhanced computing environment selected from the following:

(a) a multithreaded processing environment;

(b) a distributed processing environment;

(c) a multi-processor computer;

(d) a computer having multiple logical partitions; and (e) a parallel processing computer.

* * * * *